No. 742,293. Patented October 27, 1903.

UNITED STATES PATENT OFFICE.

TRUMAN H. CURTIS AND PETER J. KING, OF MILWAUKEE, WISCONSIN.

FISHING-BAIT AND PROCESS OF PREPARING SAME.

SPECIFICATION forming part of Letters Patent No. 742,293, dated October 27, 1903.

Application filed August 1, 1903. Serial No. 167,945. (No specimens.)

*To all whom it may concern:*

Be it known that we, TRUMAN H. CURTIS and PETER J. KING, both citizens of the United States, and residents of Milwaukee, in the county of Milwaukee and State of Wisconsin, have invented certain new and useful Improvements in Fishing-Bait and Processes of Preparing Same; and we do hereby declare that the following is a full, clear, and exact description thereof.

Our invention has for its object to provide economical, convenient, and satisfactory bait for the use of anglers, this bait being minnows that are put alive into a preserving liquid that is combined with material, preferably whipped blood, having the property of coloring said liquid to neutralize light-rays, and thus prevent fading of the preserved minnows when exposed in transparent packages, said invention being hereinafter more particularly set forth and subsequently claimed.

In the preparation of our fishing-bait we put live minnows into a preserving liquid that is preferably a low-percentage solution of formalin combined with a coloring material having the property of neutralizing light-rays, this coloring material being preferably whipped blood about three parts to ninety-seven of the preserving liquid. The minnows soon expire from inhalation of the preserving liquid, and this liquid being a formalin solution of suitable strength said minnows become firm without appreciable change in size or life appearance. The preserved minnows are put up with the colored preserving liquid in cans, jars, and other suitable packages for the trade, and if any of the packages are transparent the minnows therein will not become faded when exposed to light. Whipped blood has been found to be the best material for coloring the preserving solution, because while it acts to neutralize light-rays there is no detrimental coloring of the minnows.

The bait being furnished, as a commodity, in portable packages, it proves more economical and satisfactory to anglers than live minnows, especially for casting and trolling.

Having thus described our invention, what we claim as new, and desire to secure by Letters Patent, is—

1. A product constituting bait for the use of anglers and which consists of minnows kept in a preserving liquid that is combined with material having the property of coloring said liquid to neutralize light-rays.

2. A product constituting bait for the use of anglers and which consists of minnows kept in a preserving liquid combined with whipped blood.

3. A process of preparing bait for the use of anglers, and which consists in subjecting live minnows to a preserving liquid combined with material having the property of coloring said liquid to neutralize light-rays.

4. A process of preparing bait for the use of anglers, and which consists in subjecting live minnows to a preserving liquid combined with whipped blood.

In testimony that we claim the foregoing we have hereunto set our hands, at Milwaukee, in the county of Milwaukee and State of Wisconsin, in the presence of two witnesses.

TRUMAN H. CURTIS.
PETER J. KING.

Witnesses:
   N. E. OLIPHANT,
   E. W. HELLER.